United States Patent [19]

Courtney-Pratt

[11] 4,456,792
[45] Jun. 26, 1984

[54] VOICE SWITCHING ARRANGEMENT FOR TELEPHONE CONFERENCING

[75] Inventor: Jeofry S. Courtney-Pratt, Locust, N.J.

[73] Assignee: Bell Telephone Laboratories, Incorporated, Murray Hill, N.J.

[21] Appl. No.: 442,607

[22] Filed: Nov. 18, 1982

[51] Int. Cl.³ ............................................. H04M 3/56
[52] U.S. Cl. .............................. 179/18 BC; 179/170.2
[58] Field of Search ............ 179/18 BC, 81 B, 100 L, 179/170.2, 170.4, 170.6, 170.8; 370/62

[56] References Cited

U.S. PATENT DOCUMENTS

| | | | |
|---|---|---|---|
| 3,622,714 | 11/1971 | Berkley et al. | 179/170.2 |
| 3,694,578 | 9/1972 | Reid | 179/18 BC X |
| 3,755,625 | 8/1973 | Maston | 179/1 CN |
| 3,958,084 | 5/1976 | Nicholas | 179/18 BC |

Primary Examiner—A. D. Pellinen
Assistant Examiner—W. J. Brady
Attorney, Agent, or Firm—S. R. Williamson

[57] ABSTRACT

In a telephone conference system, a voice switching arrangement allows a speaker who has seized the line to hear and thus permit an interrupting speaker an opportunity to talk. This arrangement is achieved in a multi-party connection by using two complementary comb filter banks on a voice channel with the filter passbands of the first bank being stopbands in the second bank and vice versa. During the time when only one speaker is talking, a full voice channel is provided for the speaker. When an interrupting speaker also begins to talk, the first filter bank is inserted in the speech signal path of the speaker who has seized the line and the second filter bank inserted in the speech signal path of the interrupting speaker such that the first speaker and the interrupting speaker receive the other's speech signals.

5 Claims, 1 Drawing Figure

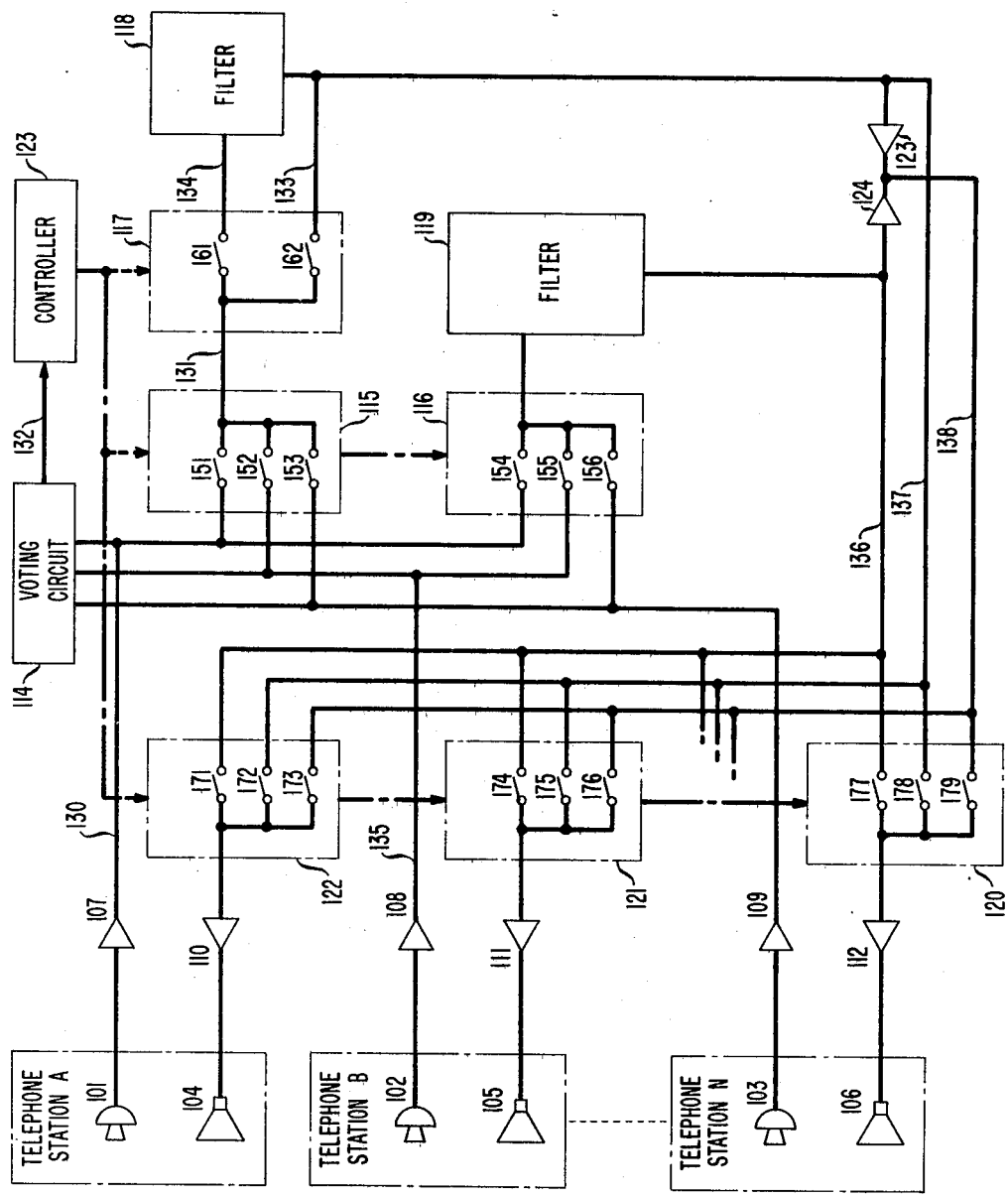

VOICE SWITCHING ARRANGEMENT FOR TELEPHONE CONFERENCING

BACKGROUND OF THE INVENTION

1. Technical Field

This invention relates to telephone conferencing arrangements and, more particularly, to voice-switched telephone conferencing arrangements employing bandstop and bandpass filters.

2. Description of the Prior Art

Telephone conferencing arrangements with multiple parties participating at a telephone station generally use voice-switched circuits to avoid undesirable acoustic coupling between a receiver and a microphone located together at the station.

In a loop comprising two "hands-free" stations, for example, there can be substantial direct acoustic coupling between the local receiver and the transmitter at each station. If at any time the net loop gain is greater than unity, the loop becomes unstable and may oscillate. The undesirable speech signal reoccurrence can be viewed as a speaker's voice returning to his own transmitter via the two direct acoustic paths, one at the remote station and the other at the talker's station.

In such loops, even when overall gain is low, there still is the problem of remote end echo, which stems from a speaker's voice returning to his ear, at a reduced but discernible level, after traveling around such a loop. For remote end echo to occur requires only one hands-free station in the loop; and both the direct and indirect acoustic paths at such station contribute to the echo.

In multipoint telephone conferencing arrangements, additional voice switching often takes place in a conference bridge which interconnects the lines from the stations and provides amplification to compensate for losses in a switched network. Hybrid echoes from the multiple paths are also present in the bridge and are minimized by attenuation circuits which place loss in a receive path whenever there is a signal in an associated send path. Thus if a person at one location talks, attenuation is placed in his receive path at the bridge. And a voice gate in the send path quiets the line in the idle state when no one is talking.

While the above arrangements have been found satisfactory in providing a stable, quiet and good level telephone conference connection, they do not allow more than one party to speak at any given time. In an effort to overcome this disadvantage and avoid the echo and feedback problems, the use of complementary comb filters was proposed by D. A. Berkley and J. S. Courtney-Pratt in U.S. Pat. No. 3,622,714, issued on Nov. 23, 1971. In this patent, two banks of comb filters are utilized on a voice channel with the filter passbands of the first bank being stopbands in the second bank and vice versa. The two filter banks are incorporated into two hands-free telephone stations, with the signal received including frequencies only within the bandpass set of the sending station. As the two passband sets are mutually exclusive, no closed feedback path exists in the loop to cause instability.

While this arrangement proved satisfactory for a conference involving two hands-free telephone stations, it is not readily adaptable to multiparty telephone conferencing.

SUMMARY OF THE INVENTION

In a multiparty telephone conferencing arrangement, a voice switching circuit allows a speaker who has seized the line to hear and thus permit an interrupting speaker an opportunity to speak. This arrangement is achieved in a multiparty connection by using complementary comb filter banks on a voice channel with the filter banks being situated at a central location. During the time when only one speaker is talking, the comb filter banks are switched out of the circuit and a full voice channel is provided for the speaker. When an interrupting speaker begins to talk, a first comb filter bank is assigned to the speech path of the first speaker and a second comb filter bank is assigned to the speech path of the interrupting speaker or the loudest of interrupting speakers. This arrangement thus allows the speaker at one station to readily realize that another speaker at another station in the conference is attempting to speak, while avoiding the echo and feedback problems generally found in such an arrangement.

BRIEF DESCRIPTION OF THE DRAWING

The present invention may best be understood by those of ordinary skill in the art by reference to the following detailed description in which:

The FIGURE is a diagram of a voice switching arrangement for telephone conferencing in accordance with the invention.

DETAILED DESCRIPTION

As shown in the FIGURE, a telephone conferencing arrangement in accordance with the invention includes telephone stations A, B, and N. Although only three stations are shown, it is intended to show that many such stations may be included in this arrangement. A plurality of microphones 101, 102, and 103, along with loudspeakers 104, 105, and 106, are respectively employed at telephone stations A, B, and N. Associated with each microphone 101 through 103 are amplifiers 107 through 109. And associated with each loudspeaker 104 through 106 are amplifiers 110 through 112, respectively.

In the operation of the arrangement, speech signals from microphones 101 through 103 are coupled to a voting circuit 114 and multiplexers 115 and 116. The output of multiplexer 115 is coupled to a second multiplexer 117 and then either to or around a comb filter 118. The output of multiplexer 116 is coupled to a second comb filter 119. The output signals of comb filters 118 and 119 are both coupled to multiplexers 120, 121, and 122. The output signals of comb filters 118 and 119 are also respectively coupled to one-way amplifiers 123 and 124. The output from these amplifiers is combined and also coupled to the multiplexers 120, 121, and 122. In response to output signals from the voting circuit 114, a controller 123 controls the operation of the multiplexers 115, 116, 117, 120, 121, and 122.

Referring now in greater detail to the operation of the voice switching arrangement, a prime speaker or one who has seized the line is able to hear and thus to allow an interrupting speaker or the loudest of interrupting speakers an opportunity to speak. The prime speaker seizes the line by being the first to speak at any telephone station. In the instance where two or more parties at different stations initially speak at the same time, the loudest of the speakers becomes the prime speaker and the second loudest speaker becomes the interrupting speaker.

If there are no interrupting speakers, the prime speaker not only seizes the line but is also assigned a full voice channel without comb filtering. For example, if the prime speaker is speaking in microphone 101 located in telephone station A, that speaker's speech signal is amplified by amplifier 107 and then coupled over line 130 to the multiplexer 115 and onto multiplexer 117 over line 131. The speech signal on line 130 is also coupled to the voting circuit 114 which provides a means for comparing any other existing signals from microphones 102 and 103. Since there are no interrupting speakers in this instance, the voting circuit 114 provides a signal over line 132 to controller 123 reflecting the fact that a speech signal is only coming from microphone 101. A voting circuit and a controller generally suitable for use in this arrangement are described both in U.S. Pat. No. 3,755,625, issued to D. J. Maston on Aug. 28, 1973, and copending U.S. patent application Ser. No. 362,034 by B. H. Lee et al., filed on Mar. 25, 1982.

Upon receiving the signal that only microphone 101 is active, controller 123 closes switch 151 in multiplexer 115 and also switch 162 in multiplexer 117. This places the speech signal on line 133 where it bypasses comb filter 118 and is coupled on line 137 to the input of multiplexers 120, 121, and 122.

These multiplexers are also controlled by controller 123. Multiplexer 120 has switch 178 closed by controller 123 and multiplexer 121 has switch 175 closed by controller 123. This couples the speech signal from microphone 101 in telephone station A to loudspeaker 105 in telephone station B and loudspeaker 106 in telephone station N. The controller does not activate a switch in multiplexer 122, however, since it is desirable that the speech signal from microphone 101 not return to the associated loudspeaker 104 because of possible echo and feedback problems. Stations B and N are identical in operation to station A in that if there are no interrupting speakers at any other station, then the speaker who has seized the line gets a full channel bypassing the comb filter 118. Clarity of operation of stations B and N in this mode should be readily apparent, given the explanation of the operation of station A.

Now if a person is speaking at station A and a person from station B desires to interrupt, the voice signal from station A remains coupled to the amplifier 107 and onto line 130 to the voting circuit 114 and the multiplexers 115 and 116. The interrupting speaker's signal is coupled from microphone 102 in telephone station B through the amplifier 108 and onto line 135 where it is also coupled to the voting circuit 114 and the multiplexers 115 and 116.

In this instance, the voting circuit 114 recognizes the presence of an interrupting signal and couples a signal reflecting this information to controller 123. Controller 123 continues to activate switch 151 in multiplexer 115 but now also activates switch 155 in multiplexer 116 and also activates switch 161 and deactivates switch 162 in multiplexer 117. Now the speech signal from microphone 101 is thus on line 134 and passes through comb filter 118. This comb filter and comb filter 119 incorporate the art of U.S. Pat. No. 3,622,714, issued on a complementary comb filter arrangement to David A. Berkley et al. on Nov. 23, 1971.

The output of comb filter 118 is coupled onto multiplexers 120, 121, and 122 via line 137. The interrupting speech signal, from microphone 102 in this example, is passed through activated switch 155 in multiplexer 116, through comb filter 119 and onto line 136 where it is also coupled to multiplexers 120, 121, and 122. The speech signals in comb filters 118 and 119 are also coupled to one-way amplifiers 123 and 124, respectively, and their outputs commonly connected to line 138. This line is also connected to multiplexers 120, 121, and 122.

In order for the speaker at station A to know that there is an interrupting speaker in the teleconference, the controller 123 closes switch 171 in multiplexer 122, thereby coupling the signal from microphone 102 into the loudspeaker 104. Switch 175 in multiplexer 121 is also closed coupling the speech signal from microphone 101 to loudspeaker 105 so that the interrupting party knows when he has been recognized. Switch 179 in multiplexer 120 is also closed, thereby coupling the signal on line 138 which contains both the prime speaker's and the interrupting speaker's speech signals and causes these signals to appear simultaneously in loudspeaker 106. Once the prime speaker is interrupted and the comb filters are in the speech paths, if the prime speaker then relinquishes the channel to the interrupting speaker, the interrupting speaker gets the full channel. Similarly, if the interrupting speaker stops talking, the full channel is then given back to the prime speaker.

This voice switching arrangement performs the switching as described irrespective of the origin of the speech signal. Hence if a speaker has seized the line by speaking into the microphone 102 at telephone station B and there is an interrupting speaker either at telephone station A or telephone station N, the person at telephone station B will be assigned comb filter 118 and the loudest of the interrupting speakers, if there happens to be two or more attempting to speak at the same time, will be assigned comb filter 119. The voice switching operation is similarly applicable for a prime speaker speaking into microphone 103 at telephone station N.

Although a specific embodiment of the invention has been shown and described, it will be understood that it is but illustrative and that various modifications may be made therein without departing from the scope and spirit of this invention as defined in the appended claims.

What is claimed is:

1. In a telephone system, a voice switching arrangement for processing simultaneous speech signals among multiple stations in a frequency channel on a telephone line, the arrangement comprising first and second filter banks centrally disposed and operably connectable to the multiple stations, each bank comprising a plurality of passband filters with the passbands of the respective banks being complementary and within the frequency channel, the first and second filter banks being removed from the speech signal path when the speech signal is originating only from a first station that has seized the telephone line, the first filter bank being inserted in the speech signal path of the first station that has seized the telephone line and the second filter bank inserted in the speech signal path of a second interrupting station in response to the speech signal from the interrupting station such that the first station and the interrupting station receive the other's speech signals.

2. The voice switching arrangement of claim 1 further comprising comparison means for comparing the speech signals from the multiple stations and controller means for assigning the first and second filter banks, the comparison means identifying the station with the speech signal initially having the greatest magnitude as the first station and the controller means operatively responsive to the comparison means assigning the first filter bank to the speech path of the first station.

3. The voice switching arrangement of claim 2 wherein the comparison means compares the speech signals from other of the multiple stations and selects as the second station the one station among the other stations having the speech signal with the greatest magnitude, the controller means assigning the second filter bank to the speech path of the second station.

4. The voice switching arrangement of claim 1 further comprising comparison means for comparing the speech signals from the multiple stations and controller means for assigning the first and second filter banks.

5. The voice switching arrangment of claim 4 or 3 wherein the comparison means when sensing the presence of only one speech signal from the multiple stations identifies this station and the controller means assigns the full channel to this station with the first and second filter banks being removed from the path of the speech signal.

* * * * *